US009571136B2

(12) United States Patent
Hwang

(10) Patent No.: US 9,571,136 B2
(45) Date of Patent: Feb. 14, 2017

(54) APPARATUS FOR TRANSMITTING AND RECEIVING SIGNALS IN RADIO FREQUENCY SYSTEM

(71) Applicant: FCI INC., Seongnam-si, Gyeonggi-do (KR)

(72) Inventor: Myung-woon Hwang, Seongnam-si (KR)

(73) Assignee: FCI INC., Seongnam-si, Gyeonggi-do (KR)

( * ) Notice: Subject to any disclaimer, the term of this patent is extended or adjusted under 35 U.S.C. 154(b) by 0 days.

(21) Appl. No.: 14/663,963

(22) Filed: Mar. 20, 2015

(65) Prior Publication Data
US 2016/0173143 A1    Jun. 16, 2016

(30) Foreign Application Priority Data
Dec. 16, 2014    (KR) .................. 10-2014-0181283

(51) Int. Cl.
*H04B 1/16*    (2006.01)
*H04B 1/04*    (2006.01)

(52) U.S. Cl.
CPC .................... *H04B 1/0475* (2013.01)

(58) Field of Classification Search
CPC ........ H04L 27/06; H04L 27/063; H04L 27/14; H04L 27/144; H04L 27/148; H04L 27/152; H04L 27/16; H04B 1/06; H04B 1/16; H04B 1/163; H04B 1/1638; H04B 1/26; H04B 7/04; H04B 7/0404; H04B 7/0413; H04B 7/08; H04B 7/0817
USPC ............... 375/267, 259, 260, 285, 316, 340, 347,375/349, 350
See application file for complete search history.

(56) References Cited

U.S. PATENT DOCUMENTS

| 7,098,967 | B2* | 8/2006 | Kanno | H03D 7/165 348/641 |
| 2003/0236079 | A1* | 12/2003 | Hasegawa | H04B 1/7083 455/160.1 |
| 2004/0218576 | A1* | 11/2004 | Imagawa | H04B 1/0057 370/342 |
| 2006/0003704 | A1* | 1/2006 | Jin | H04B 17/336 455/70 |
| 2006/0092334 | A1* | 5/2006 | Wu | H04N 5/4446 348/731 |
| 2008/0056417 | A1* | 3/2008 | Chen | H04B 1/28 375/350 |
| 2015/0214926 | A1* | 7/2015 | Tohidian | H03D 7/125 333/173 |

* cited by examiner

*Primary Examiner* — Siu Lee
(74) *Attorney, Agent, or Firm* — Hauptman Ham, LLP

(57) ABSTRACT

An apparatus for receiving signals in a radio frequency system includes a low noise amplifier that amplifies and filters a signal received from an antenna; a first frequency mixer that mixes the signal output from the low noise amplifier and an oscillation signal supplied from a local oscillator to create a signal of an intermediate frequency; a second frequency mixer that mixes the signal of an intermediate frequency and one or more oscillation signals that have an offset added to have different frequency channels, which have a predetermined bandwidth, to create one or more signals of a baseband frequency; a channel selection filter that divides one or more signals generated in the second frequency mixer into one or more different frequency channels having a predetermined bandwidth using the offset; and an amplifier that amplifies the signals that have been filtered in the channel selection filter.

9 Claims, 5 Drawing Sheets

APPARATUS FOR TRANSMITTING AND RECEIVING SIGNALS IN RADIO FREQUENCY SYSTEM

CROSS-REFERENCE TO RELATED APPLICATION

This application claims priority from and the benefit under 35 U.S.C. §119(a) of Korean Patent Application No. 10-2014-0181283, filed on Dec. 16, 2014, which is hereby incorporated by reference for all purposes as if fully set forth herein.

BACKGROUND OF THE INVENTION

1. Field of the Invention

The present embodiments relate to an apparatus for transmitting and receiving signals in a radio frequency system.

2. Description of the Prior Art

This description is intended to provide a technical background about the present embodiment, but it does not constitute the prior art.

The general method of transmitting and receiving signals using a radio frequency system is as follows. A signal received by an antenna is filtered through a band-pass filter, and then the band signal is amplified by a low noise amplifier. The signal amplified by the low noise amplifier is transformed into a fixed intermediate frequency by a frequency-down mixer. The fixed intermediate frequency output from the mixer is transformed into a baseband frequency by the frequency-down mixer to be thereby received, or the baseband frequency is transformed into the intermediate frequency and then into a frequency of a band signal by a frequency-up mixer to be thereby transmitted.

Such a transmitting/receiving apparatus can be normally operated in a typical mobile communication system, for example, the fourth generation (4G) communication system, because the typical mobile communication system utilizes signals of a bandwidth that can be processed by an apparatus, such as access points (AP) or terminals, which is connected with a receiver. However, the next generation mobile communication system, i.e., the fifth generation (5G) mobile communication system, uses signals of a super-high bandwidth that cannot be processed by the apparatus connected with the receiver, so complete transmission/reception of signals cannot be guaranteed in the next mobile communication environment. In addition, apparatuses such as access points (AP) or terminals for transmitting signals through a transmitter use the bandwidth that is used in the typical mobile communication system, such as the 4G communication system, as well. Therefore, the typical transmitting/receiving apparatus cannot make good use of the next generation (5G) mobile communication system that has a super-high bandwidth.

SUMMARY OF THE INVENTION

The present embodiment provides an apparatus that can transmit and receive signals between an antenna and an apparatus, such as an AP or a terminal, in the next generation mobile communication system as well as the typical mobile communication systems, such as 3G communications or 4G communications, in the radio frequency system.

In accordance with an aspect of the present invention, an apparatus for receiving signals in a radio frequency system may include: a low noise amplifier that amplifies and filters a signal received from an antenna; a first frequency mixer that mixes the signal output from the low noise amplifier and an oscillation signal supplied from a local oscillator to create a signal of an intermediate frequency; a second frequency mixer that mixes the signal of an intermediate frequency and one or more oscillation signals that have an offset added to have different frequency channels, which have a predetermined bandwidth, to create one or more signals of a baseband frequency; a channel selection filter that divides one or more signals generated in the second frequency mixer into one or more different frequency channels having a predetermined bandwidth using the offset; and an amplifier that amplifies the signals that have been filtered in the channel selection filter.

In accordance with another aspect of the present invention, an apparatus for receiving radio frequency signals in a multiple input multiple output (MIMO) system may include: a plurality of low noise amplifiers that amplify and filter signals received from a plurality of antennas; a plurality of the first frequency mixers that mix the signals output from the plurality of low noise amplifiers and an oscillation signal supplied from a local oscillator to create signals of an intermediate frequency; a plurality of the second frequency mixers that mix the signals of an intermediate frequency and one or more oscillation signals that have an offset added to have different frequency channels, which have a predetermined bandwidth, to create one or more signals of a baseband frequency; a plurality of channel selection filters that divide one or more signals generated in the second frequency mixers into one or more different frequency channels having a predetermined bandwidth using the offset; and a plurality of amplifiers that amplify the signals that have been filtered in the channel selection filters.

In accordance with another aspect of the present invention, an apparatus for transmitting radio frequency signals may include: one or more channel selection filters that allow one or more signals received from an apparatus connected with the apparatus for transmitting radio frequency signals to have different frequency channels; an amplifier that amplifies the signal that has passed the channel selection filter; a first frequency mixer that mixes the signal amplified by the amplifier and an oscillation signal supplied from a first local oscillator to create a signal of an intermediate frequency; a band-pass filter that mixes one or more signals created by the first frequency mixer and filters the mixed signal; a second frequency mixer that mixes the signal that has been filtered by the band-pass filter and an oscillation signal supplied from a second local oscillator to create a signal of a baseband frequency; and a driving amplifier that amplifies the signal created by the second frequency mixer.

In accordance with another aspect of the present invention, a method for receiving signals in a radio frequency system may include: amplifying and filtering a signal received from an antenna; mixing the amplified and filtered signal and an oscillation signal supplied from a local oscillator to create a signal of an intermediate frequency; mixing the signal of an intermediate frequency and one or more oscillation signals that have an offset added to have different frequency channels, which have a predetermined bandwidth, to create one or more signals of a baseband frequency; filtering the signals of a baseband frequency by a channel selection filter to divide the signals into one or more different frequency channels having a predetermined bandwidth using the offset; and amplifying the signals that have been filtered by the channel selection filter.

In accordance with another aspect of the present invention, a method for receiving radio frequency signals in a multiple input multiple output (MIMO) system may include:

amplifying and filtering signals received from a plurality of antennas; mixing the amplified and filtered signals and an oscillation signal supplied from a local oscillator, to create signals of an intermediate frequency; mixing the signals of an intermediate frequency and one or more oscillation signals that have an offset added to have different frequency channels, which have a predetermined bandwidth, to create one or more signals of a baseband frequency; filtering the signals of a baseband frequency by a channel selection filter to divides the signals into one or more different frequency channels having a predetermined bandwidth using the offset; and amplifying the signals that have been filtered by the channel selection filter.

In accordance with another aspect of the present invention, a method for transmitting radio frequency signals may include: filtering one or more received signals by a channel selection filter to have different frequency channels; amplifying the signals that have been filtered by the channel selection filter; mixing one or more amplified signals and an oscillation signal supplied from a local oscillator, to create a signal of an intermediate frequency; mixing one or more signals of an intermediate frequency and filtering the mixed signal by a band-pass filter; mixing the signal that has been filtered by the band-pass filter and an oscillation signal supplied from the local oscillator to create a signal of a predetermined frequency; and amplifying the signal of a predetermined frequency.

As described above, the transmitting and receiving apparatus according to embodiments of the present invention, can smoothly transmits and receives signals in the next generation mobile communication environment as well as the typical mobile communication environment.

DETAILED DESCRIPTION OF THE EXEMPLARY EMBODIMENTS

Figure 1:
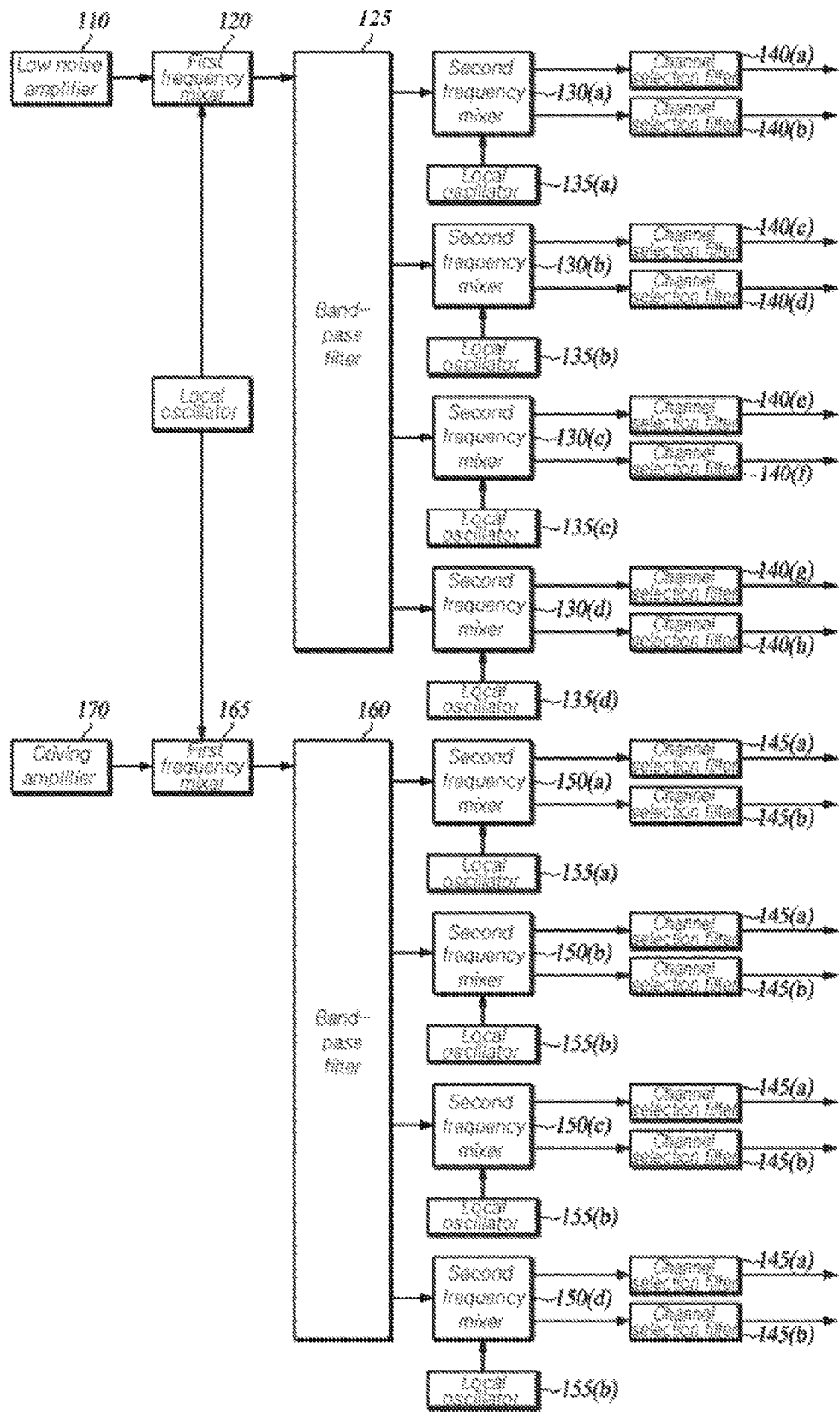
FIG. 1 illustrates a configuration of an apparatus for transmitting and receiving signals in a radio frequency system according to an embodiment of the present invention.

Hereafter, embodiments of the present invention will be described in detail with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. In the entire specification of the present application, when it is described that a certain unit "includes" or "comprises" a certain element, this means that the unit may include any other element rather than exclude the any other element unless otherwise described. The terms "unit", "module" and the like used in the specification refer to units processing at least one function or operation and may be implemented by hardware, software, or a combination thereof.

FIG. 1 illustrates a configuration of an apparatus for transmitting and receiving signal in a radio frequency system according to an embodiment of the present invention.

Referring to FIG. 1, the apparatus for transmitting and receiving signals in a radio frequency system according to an embodiment of present invention, may include the low noise amplifier 110, local oscillators 115, 135 and 155, the first frequency mixers 120 and 165, band-pass filters 125 and 160, the second frequency mixers 130 and 150, channel selection filters 140 and 145, and a driving amplifier 170.

The low noise amplifier (LNA) 110, which is provided at a receiver, may amplify a signal that has been received by an antenna (not shown) and then has passed through the band-pass filter (not shown). Moreover, the low noise amplifier may reduce a noise of the signal that has been received by the antenna and then has passed through the band-pass filter. In the 5G communication system, a signal received by the antenna may have a bandwidth more than 1 GHz, and communications may be performed using a frequency of dozens of GHz. Preferably, the 5G communication system may mainly use a bandwidth between 28 GHz and 30 GHz.

The local oscillators (LO) 115, 135, and 155 may be provided at both the transmitter and the receiver, and may convert a frequency of a signal received by the first frequency fixer or the second frequency mixer. That is, the local oscillator is a frequency source that generates an oscillation signal of a specific frequency, in order to transform the frequency of a signal that is input into the first frequency fixer or the second frequency mixer, into a desired frequency.

The first frequency mixers 120 and 165 are provided at both the transmitter and the receiver, and may generate a specific frequency signal by mixing input signals into the first frequency mixers with the oscillation signal generated from the local oscillator.

The first frequency mixer 120 at the receiver may generate a signal having a predetermined intermediate frequency by mixing the signal that has been received by the antenna and has passed through the low noise amplifier and the oscillation signal generated from the local oscillator 115. For example, in the case in which the signal that has been received by the antenna and has passed through the low noise amplifier has a frequency of 28 GHz and the predetermined intermediate frequency is 2 GHz, the local oscillator may generate the oscillation signal having a frequency of 30 GHz to attain the predetermined intermediate frequency. The first frequency mixer may mix the input signal having a frequency of 28 GHz and the oscillation signal having a frequency of 30 GHz to thereby create a signal of 2 GHz corresponding to the predetermined intermediate frequency value. However, this is only an example, and the predetermined intermediate frequency value may vary with a frequency of the signal received by the antenna.

The first frequency mixer 165 at the transmitter may mix a signal having a predetermined intermediate frequency, which has passed through the second frequency mixer 150 and the band-pass filter 160, and the oscillation signal generated from the local oscillator 115 to thereby create a signal having a frequency to be transmitted by the antenna in the mobile communications. For example, in the case of a predetermined intermediate frequency of 2 GHz, the first frequency mixer 165 may mix a signal of 2 GHz and an oscillation signal of 30 GHz to create a signal of 28 GHz that is proper for transmission by the antenna in the 5G communication system.

Although the first frequency mixers 120 and 165 are explained to generate a signal having a specific frequency by mixing the input signal and the oscillation signal in the present embodiment, the first frequency mixers 120 and 165 may generate an in-phase signal of a specific frequency and a quadrature-phase signal of a specific frequency in some cases.

The band-pass filters 125 and 160 are provided at both the transmitter and the receiver, and may select signals that have the predetermined intermediate frequency. In general, when the frequency mixer mixes different frequencies, it is likely that signals having an undesired frequency, i.e., an image frequency, may be generated together with signals having a desired frequency. Therefore, the band-pass filter is connected with the first frequency mixer at the receiver or the second frequency mixer at the transmitter to thereby eliminate the signal of the image frequency, which is likely to be generated from each frequency mixer. The signal that has passed through the band-pass filter 125 at the receiver, decreases in the amplitude thereof, so it is required to amplify the reduced amplitude of the signal. Therefore, an amplifier (not shown) for amplifying the reduced amplitude of the signal may be connected to the band-pass filter 125 of the receiver.

The second frequency mixers 130 and 150 are provided at both the transmitter and the receiver, and may mix a signal having an intermediate frequency with an oscillation signal generated from the local oscillator to thereby create a signal having a predetermined baseband frequency.

The second frequency mixer 130 at the receiver may mix the signal having a predetermined intermediate frequency after passing through the band-pass filter 125 with the oscillation signal generated from the local oscillator to thereby create the signal having a predetermined baseband frequency. Here, the baseband may be determined according to the usage of a signal having a baseband frequency in the apparatus such access points (AP) or terminals, which is to be connected with the receiver according to an embodiment of the present invention. For example, if the apparatus to be connected with the receiver, according to an embodiment of the present invention, is a mobile communication terminal, and the signal having a baseband frequency is to be used for applications of the terminal, the mobile communication terminal requires a direct current signal (e.g., 0 Hz). Accordingly, in this case, an oscillation signal having the same frequency as the intermediate frequency is mixed with the signal that has passed through the band-pass filter 125 to thereby create the direct current signal of 0 Hz.

The bandwidth of the signal that has passed through the band-pass filter 125 at the receiver in the next generation mobile communication system, such as the 5G communications, is much higher than that of the signal in the 4G communications, so the apparatus to be connected with the receiver cannot process big data of the signals that have passed through the band-pass filter 125. Therefore, it is required to divide the signal that has passed the band-pass filter 125 of the receiver and transmit the divided signal to the apparatus to be connected with the receiver. One or more local oscillators 135(*a*) to 135(*d*) may generate oscillation signals having the same frequency in order to allow the second frequency mixers 130(*a*) to 130(*d*) to generate signals having the same baseband frequency. However, in order to divide the signal that has passed through the band-pass filter 125 of the receiver into a plurality of frequency channels, the local oscillator may add an offset to have a predetermined bandwidth and to have different frequency channels to the oscillation signals having the same frequency. The second frequency mixer may mix the signal that has passed through the band-pass filter 125 of the receiver and the oscillation signal with the offset added, to thereby create a signal of a specific frequency channel, which has a baseband frequency and a predetermined bandwidth. At this time, the number of signals of a specific frequency channel, which have a baseband frequency and a predetermined bandwidth, may vary with the signal that has passed through the band-pass filter 125 of the receiver. A single of the second frequency mixer may be operated by operation of a single local oscillator, or two or more of the second frequency mixers may be operated by operation of one or more local oscillators. Although FIG. 1 shows that the signal that has passed through the band-pass filter 125 of the receiver is divided into four signals, the present invention is not limited thereto. Alternatively, the signal that has passed through the band-pass filter 125 of the receiver may be divided into a plurality of signals by comparing the bandwidth of the signal that has passed through the band-pass filter 125 of the receiver with the bandwidth of the signal of a specific frequency channel, which has a baseband frequency and a predetermined bandwidth.

In generating the signals of a specific frequency channel, which have a baseband frequency and a predetermined bandwidth, as set forth above, the second frequency mixers 130(*a*) to 130(*d*) of the receiver may generate in-phase signals and quadrature-phase signals. That is, the second frequency mixers 130(*a*) to 130(*d*) of the receiver may generate in-phase signals and quadrature-phase signals, which have half the predetermined bandwidth, respectively. Furthermore, as set forth above, the first frequency mixer as well as the second frequency mixer may generate in-phase signals and quadrature-phase signals, respectively.

The second frequency mixers 150(*a*) to 150(*d*) at the transmitter may mix signals, which have been received from the apparatus connected with the transmitter and then have passed the channel selection filters to have specific channels, and oscillation signals generated in the local oscillators 155 to thereby output signals having a predetermined intermediate frequency. For example, when a direct signal is received from an apparatus connected with the transmitter, the direct signal is transformed into a direct signal having a specific frequency channel of a predetermined bandwidth by passing through the channel selection filter. Then, the direct signal having a specific frequency channel of a predetermined bandwidth is mixed with an oscillation signal having a predetermined intermediate frequency to be thereby output as a signal that has a predetermined intermediate frequency. Considering that a plurality of signals are received from the apparatus connected with the transmitter, one or more of the second frequency mixers may be provided at the transmitter. A plurality of local oscillators and a plurality of the second frequency mixers may be provided with respect to signals that are transferred from the apparatus connected with the transmitter to the transmitter according to a predetermined bandwidth.

The channel selection filters 140 and 145 are provided at both the transmitter and the receiver, and may filter frequencies, except for a predetermined frequency from signals generated by the apparatus connected with the second frequency mixer or the receiver in order to thereby select the predetermined frequency.

The channel selection filters 140(*a*) to 140(*h*) at the receiver may select a predetermined frequency channel from signals generated in the second frequency mixer. Since the oscillation signal generated by the local oscillator 155 includes an offset to have a predetermined frequency channel, the channel selection filter can select the predetermined frequency channel. In addition, the signal amplitude decreases as passing the channel selection filter, so it is required to amplify the signal amplitude. Therefore, an amplifier (not shown) for amplifying the reduced signal amplitude may be connected to the channel selection filter at the receiver.

The channel selection filter 145 of the transmitter may select a predetermined frequency channel from signals generated by an apparatus connected with the transmitter by filtering frequency channels except for the predetermined frequency channel. Considering that a plurality of signals may be received from the apparatus connected with the transmitter, one or more channel selection filters may be provided at the transmitter. A plurality of channel selection filters may be provided with respect to signals that are transferred from the apparatus connected with the transmitter to the transmitter according to a predetermined bandwidth.

The driving amplifier 170 is provided at the transmitter to amplify signals that have decreased in amplitude thereof on the way through the band-pass filter 160 at the transmitter. Transmission of signals at the antenna (not shown) requires high power, so signal power needs to be amplified. Therefore, the signal power is amplified using a power amplifier (not shown) before transmission thereof. At this time, in order to drive the power amplifier, the signals should be amplified more than a predetermined value. That is, the driving amplifier is for driving the power amplifier, and may amplify the signal amplitude to amplify the signal power.

Elements included in the apparatus 100 for transmitting and receiving signals in a radio frequency system may be connected with communication paths that connect software modules or hardware modules with each other to be thereby operated organically. There elements communicate using one or more communication buses or signal lines.

Figure 2:
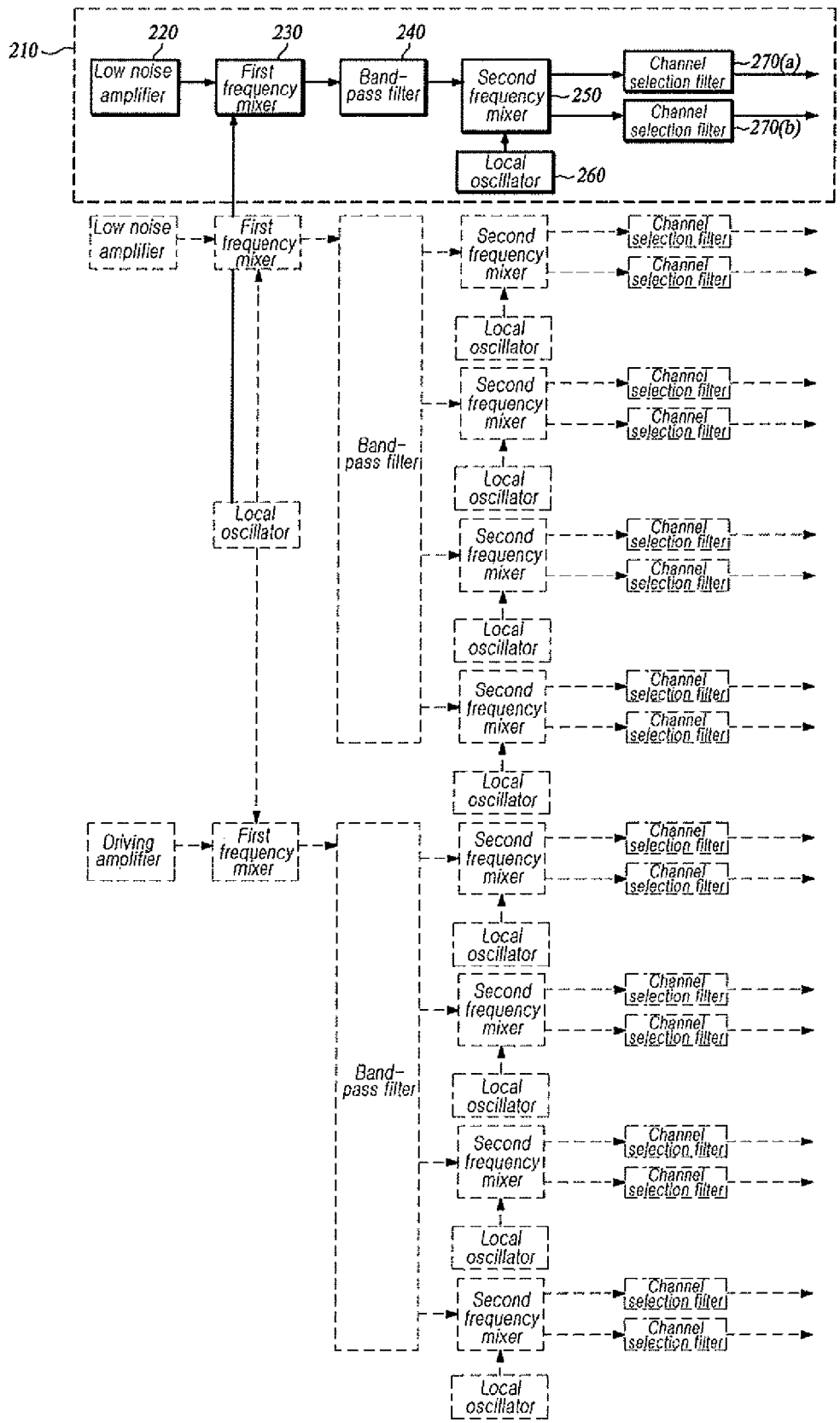
FIG. 2 illustrates a configuration of an apparatus for transmitting and receiving signals in a radio frequency system according to another embodiment of the present invention.

FIG. 2 illustrates a configuration of an apparatus for transmitting and receiving signals in a radio frequency system according to another embodiment of the present invention.

Referring to FIG. 2, the apparatus for transmitting and receiving signals in a radio frequency system according to another embodiment of the present invention, may include the configuration of the apparatus for transmitting and receiving signals in a radio frequency system shown in FIG. 1, and a signal searching apparatus 210. Here, the apparatus for transmitting and receiving signals in a radio frequency system of FIG. 1 is illustrated by dotted lines, and description thereof will be omitted.

Since a signal frequency used in the next generation mobile communications such as 5G communications is super-higher than the signal frequency used in typical 4G communications, signals in the 5G environment have strong directional properties, compared to the typical signals. Accordingly, the apparatus 200 for transmitting and receiving signals in a radio frequency system includes the signal searching apparatus 210 to determine the direction of the antenna or the installation direction of the antenna for smooth communications.

The signal searching apparatus 210 has the same configuration as that of the receiver in the apparatus for transmitting and receiving signals in a radio frequency system of FIG. 1. However, the signal searching apparatus 210 includes a single local oscillator and a single of the second frequency mixer instead of the plurality of local oscillators and the plurality of the second frequency mixers as shown in the configuration of the receiver of the transmitting/receiving apparatus of FIG. 1, so that the apparatus connected with the receiver recognizes the sensitivity or the intensity of a signal received from the antenna. With a single local oscillator and a single of the second frequency mixer provided, the signal searching apparatus 210 receives a signal that has a single specific frequency channel. Using the signal having a single specific frequency channel, the apparatus connected with the receiver recognizes the sensitivity or the intensity of the signal received from the antenna. The direction of the antenna or the installation direction of the antenna may be determined according to the recognized sensitivity or intensity of the signal.

Figure 3:
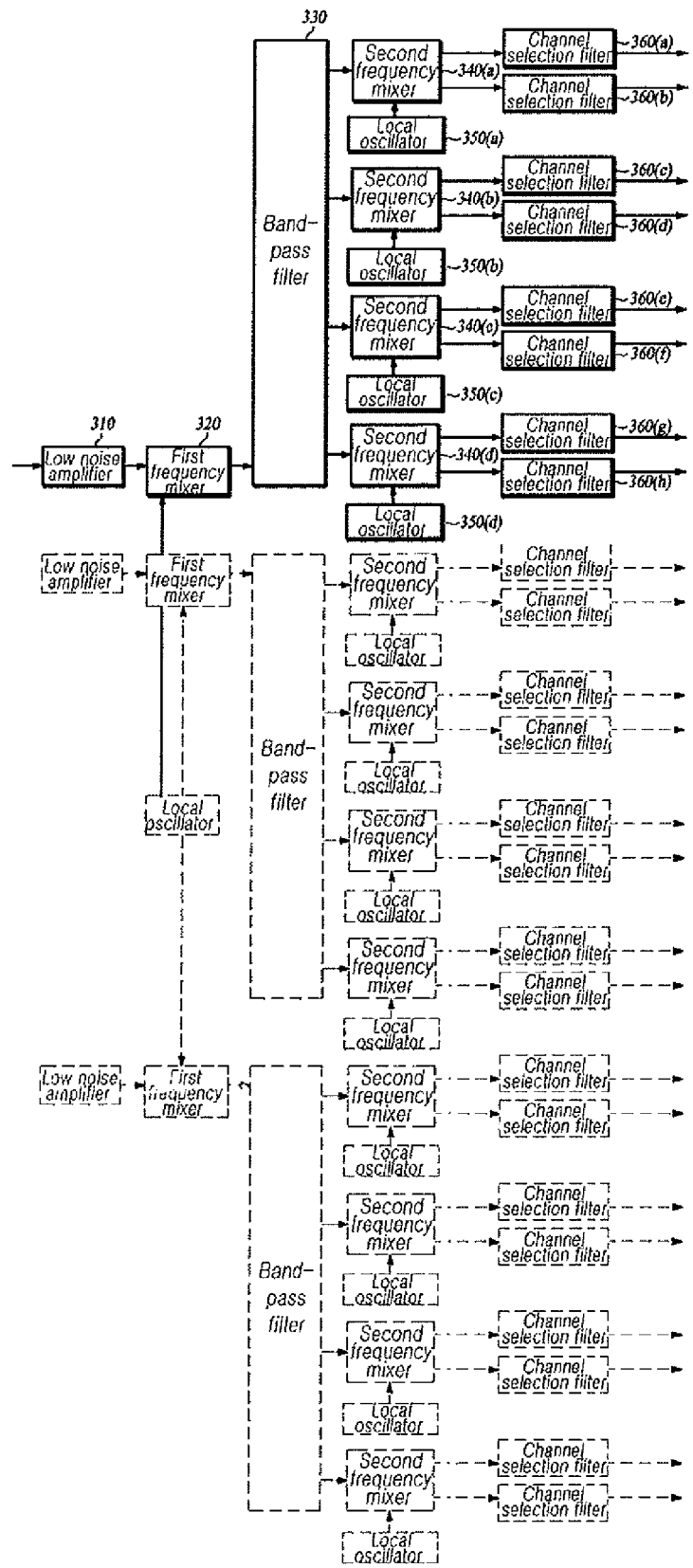
FIG. 3 illustrates a configuration of an apparatus for transmitting and receiving signals in a radio frequency system according to still another embodiment of the present invention.

FIG. 3 illustrates a configuration of an apparatus for transmitting and receiving signals in a radio frequency system according to still another embodiment of the present invention.

Referring to FIG. 3, the apparatus for transmitting and receiving signals in a radio frequency system according to still another embodiment of the present invention, may have the same transmitting/receiving apparatus as that of FIG. 1. In the drawing, the configuration illustrated by dotted lines denotes the transmitting/receiving apparatus of FIG. 1, and the configuration illustrated by solid lines denotes an auxiliary transmitting/receiving apparatus that performs the same function as that of FIG. 1 as well, so detailed description about the transmitting/receiving apparatus will be omitted here.

Another embodiment of the present invention shows a transmitting/receiving apparatus in a multiple input multiple output (MIMO) system. Since a plurality of antennas that have different diversities due to a plurality of inputs may be provided, the MIMO system may adopt a plurality of transmitters/receivers. The plurality of transmitters/receivers may process signals received from each antenna or signals to be transmitted to each antenna. The signal searching apparatus described in FIG. 2 may be included as a separate element, or one of the plurality of receivers may search signals using a single frequency channel having a predetermined bandwidth.

Although two receivers are illustrated in FIG. 3, but not limited thereto, three or more receivers may be adopted in some cases. In addition, even though a single receiver is illustrated in the drawing, the present invention is not limited thereto.

Figure 4A:
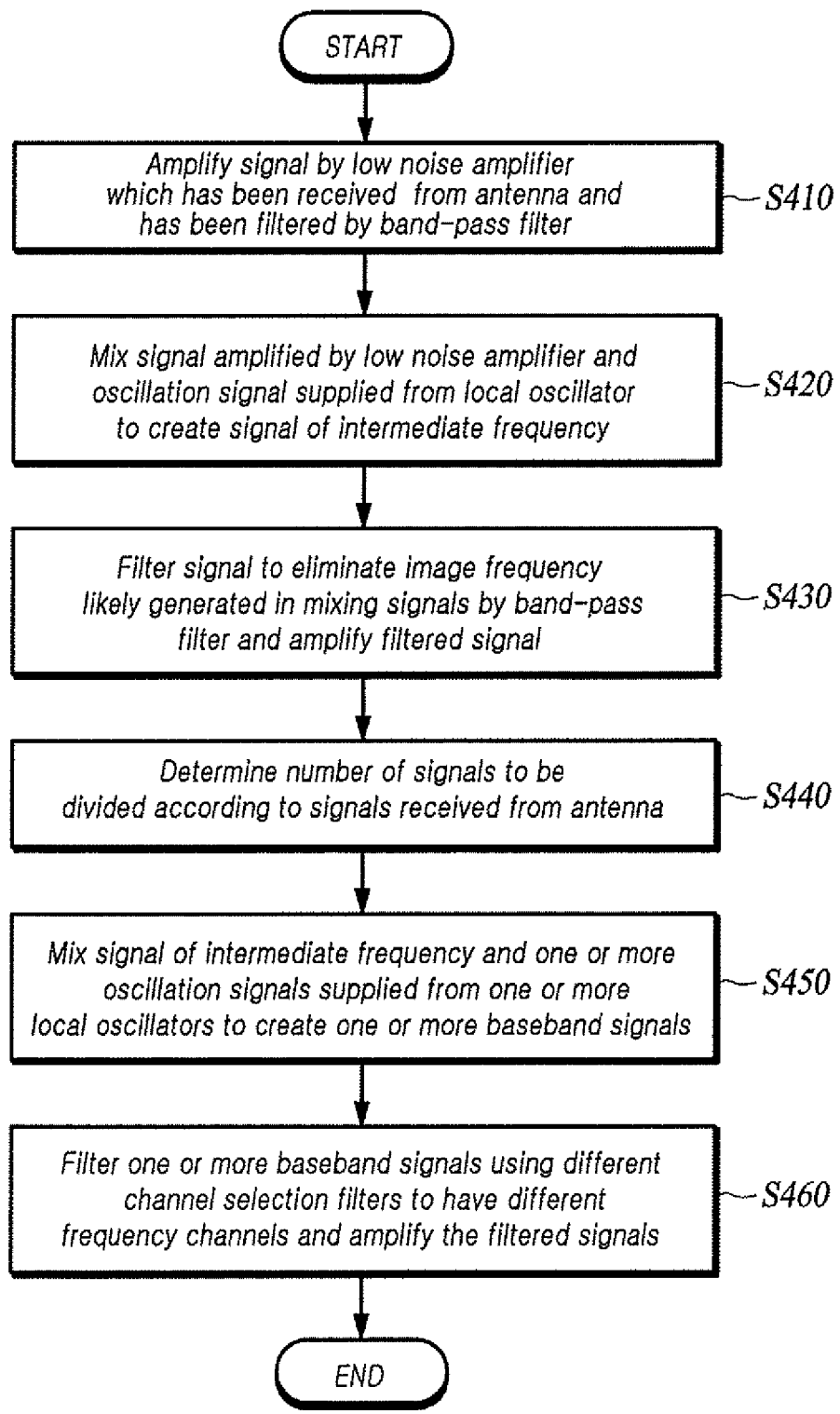
FIG. 4a is a flowchart illustrating a method for receiving signals in a radio frequency system according to an embodiment of the present invention.

FIG. 4*a* is a flowchart illustrating a method for receiving signals in a radio frequency system according to an embodiment of the present invention.

The signal that has been received from the antenna and has passed through the band-pass filter may be amplified using the low noise amplifier (S410). In addition, the low noise amplifier may attenuate a noise of the signal that has been received from the antenna and has passed through the band-pass filter.

The signal amplified by the low noise amplifier and the oscillation signal generated by the local oscillator are mixed to thereby create a signal having an intermediate frequency (S420). Although the present embodiment shows that the input signal and the oscillation signal are mixed to create a signal having a specific frequency, in-phase signals and quadrature-phase signals, which have a specific frequency, may be created in some cases.

The band-pass filter may filter the signal to eliminate an image frequency that is likely to be generated in mixing the signals, and then the signal that has passed through the band-pass filter may be amplified (S430).

The number of signals that are to be divided into signals having a predetermined bandwidth, may be determined according to the signal received from the antenna (S440).

The signal having the intermediate frequency and the oscillation signal generated by one or more local oscillators according to the determined number of signals are mixed to thereby create one or more baseband signals (S450). One or more local oscillators may generate the oscillation signals that have the same frequency in order to allow the second frequency mixers to generate the signals having the same baseband frequency. However, in order to divide the signal received in the receiver into each of frequency channels, the local oscillator may add an offset having a predetermined bandwidth and different frequency channels to the oscillation signal having the same frequency. The second frequency mixer may mix the signal received in the receiver and the oscillation signal with the offset added to thereby create a signal of a specific frequency channel having a predetermined bandwidth, which has a baseband frequency. In addition, in creating the signal of a specific frequency channel having a predetermined bandwidth, which has a baseband frequency, the second frequency mixer at the receiver may generate in-phase signals and quadrature-phase signals. One or more baseband signals may be filtered by the different channel selection filters to have different frequency channels, and the signals that have passed the channel selection filters may be amplified (S460).

Although operations S410 to S460 are performed in sequence in FIG. 4a, it is only an example of technical embodiments of the present invention, and the present invention is not limited to the sequential procedure of FIG. 4a. That is, those skilled in the art may modify the operations S410 to S460 without departure from the scope of the present invention so that the sequence of operations S410 to S460 may be changed or one or more operations may be performed at the same time.

Figure 4B:
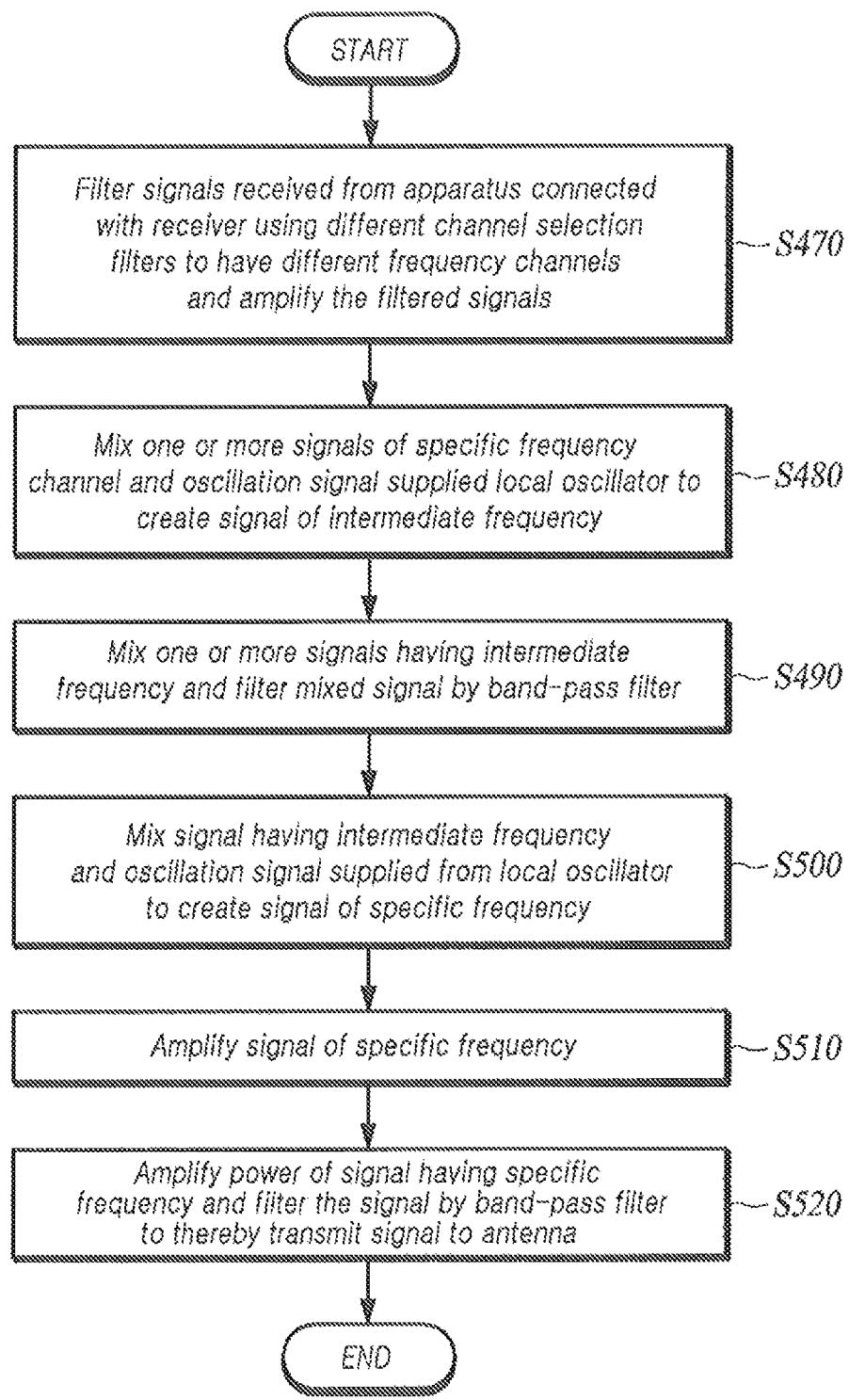
FIG. 4b is a flowchart illustrating a method for transmitting signals in a radio frequency system according to an embodiment of the present invention.

FIG. 4b is a flowchart illustrating a method for transmitting signals in a radio frequency system according to an embodiment of the present invention.

The signals received from the apparatus connected with the transmitter may have different frequency channels by passing through different channel selection filters, and the signals that have passed the channel selection filters may be amplified (S470). A single signal or a plurality of signals may be received from the apparatus connected with the transmitter.

One or more signals having a specific frequency channel and the oscillation signal generated by the local oscillator may be mixed to thereby create a signal having an intermediate frequency (S480). The frequency of the oscillation signal may be selected to allow the created signal to have the intermediate frequency, considering one or more signal frequencies having a specific frequency channel.

One or more signals having the intermediate frequency may be mixed, and the mixed signal is filtered by the band-pass filter (S490).

The signal having the intermediate frequency and the oscillation signal generated by the local oscillator are mixed to thereby create a signal having a specific frequency (S500). For example, the signal having the intermediate frequency and the oscillation signal generated by the local oscillator may be mixed to thereby create a signal having a frequency of 28 GHz in the next generation mobile communication environment, and a frequency of 2 GHz in the typical mobile communication environment, respectively.

The signal having a specific frequency may be amplified (S510). The signal having a specific frequency decreases in the amplitude thereof by passing the band-pass filter. In addition, the amplitude of the signal may be amplified using the driving amplifier because a signal having amplitude more than a critical value is required to amplify signal power using the power amplifier.

The power of the signal having the specific amplified frequency may be amplified, and then the signal may pass through the band-pass filter to be thereby transmitted to the antenna (S520).

Although operations S470 to S520 are performed in sequence in FIG. 4b, it is only an example of technical embodiments of the present invention, and the present invention is not limited to the sequential procedure of FIG. 4b. That is, those skilled in the art may modify the operations S470 to S520 without departure from the scope of the present invention so that the sequence of operations S470 to S520 may be changed or one or more operations may be performed at the same time.

Meanwhile, the methods of FIGS. 4a and 4b may be implemented by codes that can be read by computers, which are recorded in a computer-readable recording medium. The computer-readable recording medium may include all kinds of recording media that store data so as to be read by computer systems. That is, computer-readable recording medium may include a magnetic recording medium (e.g., ROMs, floppy discs, hard discs, or the like), an optical readable medium (e.g., CD-ROMs, DVDs, or the like), and carrier waves (e.g., transmission through the Internet). In addition, the computer-readable recording medium may be distributed among computer systems connected with each other by networks, and computer-readable codes may be stored and executed through a distributed system.

Although the embodiments of the present invention have been described for illustrative purposes, those skilled in the art will appreciate that various modifications, additions and substitutions are possible, without departing from the scope and spirit of the invention. Accordingly, the embodiments disclosed in the present invention are not intended to limit, but are merely intended to describe the technical spirit of the present invention. Further, the scope of the technical spirit of the present invention is limited by the embodiments. The scope of the present invention shall be construed on the basis of the accompanying claims in such a manner that all of the technical ideas included within the scope equivalent to the claims belong to the present invention.

What is claimed is:

1. An apparatus for receiving signals in a radio frequency system, the apparatus comprising:
  a first low noise amplifier that amplifies and filters a signal received from an antenna;

a first frequency mixer that mixes the signal output from the first low noise amplifier and an oscillation signal supplied from a local oscillator to create a signal of an intermediate frequency;

a second frequency mixer that mixes the signal of the intermediate frequency with a plurality of oscillation signal comprises one or more oscillation signals that have an offset added to have different frequency channels, which have a predetermined bandwidth, to create a plurality of signals of a baseband frequency;

a first channel selection filter that divides one signal generated in the second frequency mixer into one predetermined frequency channel having a predetermined bandwidth using the offset;

a first amplifier that amplifies the signals that have been filtered in the first channel selection filter; and a signal searching apparatus that divides the signal received from the antenna into baseband frequency channels to allow the signal searching apparatus connected with the apparatus for receiving signals in a radio frequency system to recognize the sensitivity or the intensity of the signal received from the antenna.

2. The apparatus of claim 1, further comprising a filter that eliminates an image frequency generated from the first frequency mixer, and a second amplifier that amplifies the signal that has been filtered by the filter.

3. The apparatus of claim 1, wherein the second frequency mixer allows a number of the signals of a baseband frequency to vary with the intermediate frequency signal.

4. The apparatus of claim 1, wherein the second frequency mixer creates the signals of a baseband frequency so that each of signals of a baseband frequency has an in-phase signal and a quadrature-phase signal.

5. The apparatus of claim 1, wherein the signal searching apparatus comprises:
a second low noise amplifier that amplifies and filters the signal received from the antenna;
a third frequency mixer that mixes the signal output from the second low noise amplifier and an oscillation signal supplied from the local oscillator to create a signal of an intermediate frequency;
a fourth frequency mixer that mixes the signal of the intermediate frequency and a single oscillation signal that has an offset added to have different frequency channels, which has a predetermined bandwidth, to create a signal of a baseband frequency;
a second channel selection filter that divides the single signal generated in the fourth frequency mixer into a single frequency channel having a predetermined bandwidth using the offset; and
a third amplifier that amplifies the signal that has been filtered in the second channel selection filter.

6. An apparatus for receiving radio frequency signals in a multiple input multiple output (MIMO) system, the apparatus comprising:
a plurality of low noise amplifiers that amplify and filter signals received from a plurality of antennas;
a plurality of the first frequency mixers that mix the signals output from the plurality of low noise amplifiers and an oscillation signal supplied from a local oscillator to create signals of an intermediate frequency;
a plurality of the second frequency mixers that mix the signals of an intermediate frequency and one or more oscillation signals that have an offset added to have different frequency channels, which have a predetermined bandwidth, to create a plurality of signals of a baseband frequency;
a plurality of channel selection filters that divide one signal generated in the second frequency mixers into one predetermined frequency channel having a predetermined bandwidth using the offset;
a plurality of amplifiers that amplify the signals that have been filtered in the channel selection filters; and
wherein a searching apparatus connected with the apparatus for receiving radio frequency signals uses a single signal of a frequency channel generated from one of the predetermined second frequency mixers and one of the predetermined channel selection filters in order to recognize the sensitivity or the intensity of the signal received from the antenna.

7. A method for receiving signals in a radio frequency system, the method comprising:
amplifying and filtering a signal received from an antenna;
mixing the amplified and filtered signal and an oscillation signal supplied from a local oscillator to create a signal of an intermediate frequency;
mixing the signal of an intermediate frequency with a plurality of oscillation signal comprises one or more oscillation signals that have an offset added to have different frequency channels, which have a predetermined bandwidth, to create a plurality of one or more signals of a baseband frequency;
dividing one of the signals of the baseband frequency into one predetermined frequency channel having a predetermined bandwidth using the offset;
amplifying the signals that have been filtered by the channel selection filter;
dividing the signal received from the antenna into baseband frequency channels to recognize the sensitivity or the intensity of the signal received from the antenna; and
wherein a number of the signals of a baseband frequency varies with the intermediate frequency signal.

8. The method of claim 7, wherein the creating of the signal of an intermediate frequency comprises filtering the signal to eliminate an image frequency that is likely to be generated, and amplifying the filtered signal.

9. A method for receiving radio frequency signals in a multiple input multiple output (MIMO) system, the method comprising:
amplifying and filtering signals received from a plurality of antennas;
mixing the amplified and filtered signals and an oscillation signal supplied from a local oscillator, to create signals of an intermediate frequency;
mixing the signals of an intermediate frequency and one or more oscillation signals that have an offset added to have different frequency channels, which have a predetermined bandwidth, to create a plurality of signals of a baseband frequency;
dividing one of the signals of the baseband frequency into one predetermined frequency channel having a predetermined bandwidth using the offset;
amplifying the signals that have been filtered by the channel selection filter; and
dividing the signal received from the antenna into baseband frequency channels to recognize the sensitivity or the intensity of the signal received from the antenna.

* * * * *